(12) United States Patent
Harris

(10) Patent No.: US 7,164,741 B2
(45) Date of Patent: Jan. 16, 2007

(54) NON-RECURSIVE RESAMPLING DIGITAL FIR FILTER STRUCTURE FOR DEMODULATING 3G CELLULAR SIGNALS

(75) Inventor: Fredric Joel Harris, Lemon Grove, CA (US)

(73) Assignee: Signum Concept, Inc., Lemon Grove, CA (US)

( * ) Notice: Subject to any disclaimer, the term of this patent is extended or adjusted under 35 U.S.C. 154(b) by 711 days.

(21) Appl. No.: 09/905,716

(22) Filed: May 9, 2001

(65) Prior Publication Data

US 2003/0118134 A1 Jun. 26, 2003

(51) Int. Cl.
*H04B 1/10* (2006.01)
*H03H 7/30* (2006.01)
*H04J 1/00* (2006.01)

(52) U.S. Cl. ............... 375/350; 375/229; 370/342
(58) Field of Classification Search ........... 375/220, 375/240, 316, 350, 344, 229; 370/396, 437, 370/466, 342; 455/168.1, 434, 454, 450–564, 455/507
See application file for complete search history.

(56) References Cited

U.S. PATENT DOCUMENTS

| 4,864,526 | A | * | 9/1989 | Dyer .................... 708/313 |
|---|---|---|---|---|
| 4,942,466 | A | * | 7/1990 | Sandbank et al. ..... 375/240.01 |
| 5,309,484 | A | * | 5/1994 | McLane et al. .......... 375/354 |
| 5,375,146 | A | * | 12/1994 | Chalmers ................ 375/350 |
| 5,504,785 | A | * | 4/1996 | Becker et al. ........... 375/344 |
| 5,566,173 | A | * | 10/1996 | Steinbrecher ............ 370/466 |
| 5,640,416 | A | * | 6/1997 | Chalmers ................ 375/147 |
| 5,657,261 | A | * | 8/1997 | Wilson et al. ........... 708/313 |
| 5,757,867 | A | * | 5/1998 | Caulfield et al. ........ 375/350 |
| 5,926,455 | A | * | 7/1999 | Allpress ................. 370/210 |
| 6,111,911 | A | * | 8/2000 | Sanderford et al. ...... 375/147 |
| 6,134,268 | A | * | 10/2000 | McCoy ................... 375/229 |
| 6,141,372 | A | * | 10/2000 | Chalmers ................ 375/147 |
| 6,411,653 | B1 | * | 6/2002 | Arunachalam et al. .... 375/260 |
| 6,480,535 | B1 | * | 11/2002 | Witmayer ............... 375/232 |
| 6,496,546 | B1 | * | 12/2002 | Allpress et al. ......... 375/316 |
| 6,531,969 | B1 | * | 3/2003 | Chu ....................... 341/61 |
| 6,798,850 | B1 | * | 9/2004 | Wedin et al. ............ 375/340 |
| 2002/0193085 | A1 | * | 12/2002 | Mathe et al. ............ 455/126 |
| 2003/0076899 | A1 | * | 4/2003 | Kumar et al. ........... 375/316 |
| 2004/0095951 | A1 | * | 5/2004 | Park ....................... 370/437 |
| 2004/0162023 | A1 | * | 8/2004 | Cho ....................... 455/41.1 |

* cited by examiner

*Primary Examiner*—Emmanuel Bayard
*Assistant Examiner*—Lawrence Williams
(74) *Attorney, Agent, or Firm*—Robert A. Brown

(57) ABSTRACT

A filter and processing sequence is described that efficiently combines and performs two or more tasks required to demodulate a composite 3G (third generation) wireless signal formed by a combination of wideband 3.84 MHz (Universal Mobile Telecommunications System, identified, as acronym "UMTS", or Universal Mobile Telecommunications System Terrestrial Radio Access, identified as acronym "UTRA") carriers and narrowband 1.2288 MHz CDMA-2000 carriers. The three tasks, applied to each spectral component of the 3G wireless signal and described in the order of a traditional filtering structure are: Spectral translation, Bandwidth Reduction, and Sample Rate Selection. These tasks are traditionally implemented in three distinct pieces of hardware or software modules.

2 Claims, 17 Drawing Sheets

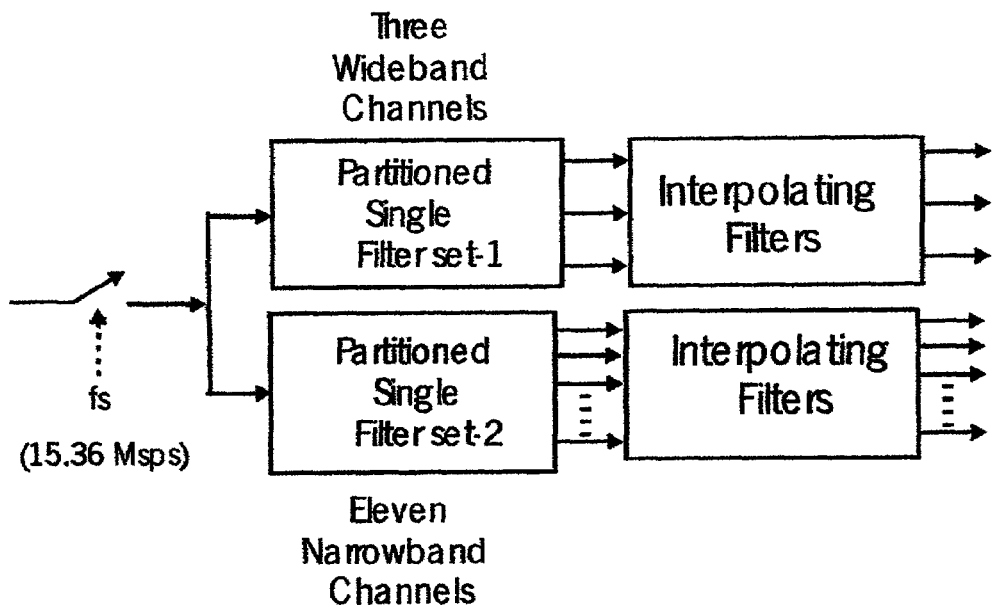
Figure 7.1
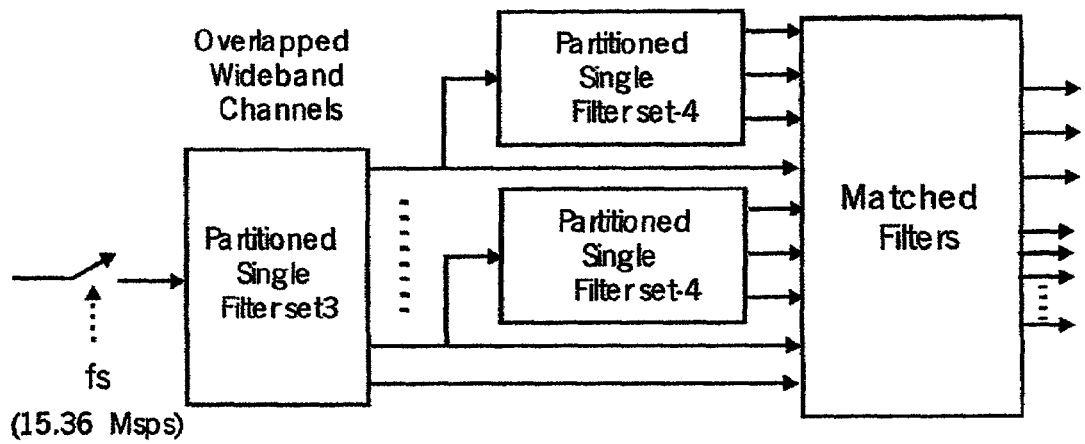
Figure 8.

NON-RECURSIVE RESAMPLING DIGITAL FIR FILTER STRUCTURE FOR DEMODULATING 3G CELLULAR SIGNALS

BACKGROUND OF THE INVENTION

A filter and processing sequence is described that efficiently combines and performs two or more tasks required to demodulate a composite 3G (third generation) wireless signal formed by a combination of wideband 3.84 MHz (Universal Mobile Telecommunications System, hereinafter referred to as "UMTS" or Universal Mobile Telecommunications System Terrestrial Radio Access, hereinafter referred to as "UTRA") carriers and narrowband 1.2288 MHz CDMA-2000 carriers. The three tasks, applied to each spectral component of the 3G wireless signal and described in the order of a traditional filtering structure are: Spectral translation, Bandwidth Reduction, and Sample Rate Selection. These tasks are traditionally implemented in three distinct pieces of hardware or software modules.

The spectrum processed by the receiver is shown in FIG. 1 while a block diagram of a traditional digital receiver that processes a signal with this spectrum is shown in FIG. 2. Note that the center frequencies of the wide-band signals are at multiples of 5.0 MHz while the center frequencies of the narrowband signals are at multiples of 1.25 MHz. The sample frequencies, shown in parenthesis and indicated on the block diagram, are typical and can be changed within wide limits and are presented here for purpose of discussing a specific example. Particular implementation efficiency is to be had when the sample rate is selected to be a rational multiple of the spectral spacing between band centers. This condition makes the spectral down conversion particularly simple. Similarly, implementation efficiency is also to be had when the sample rate is selected to be a rational multiple of the desired output sample rate. This condition makes the alignment of time samples with signal epochs particularly simple. Neither condition is a requirement for the process described here, since an arbitrary rate interpolator can be used to align the sampling clock with either timing or carrier sub systems.

BRIEF DESCRIPTION OF THE DRAWING

FIG. 7 shows Parallel Spectral Partition.

FIG. 8 shows Cascade Spectral Partition.

Figure 1:
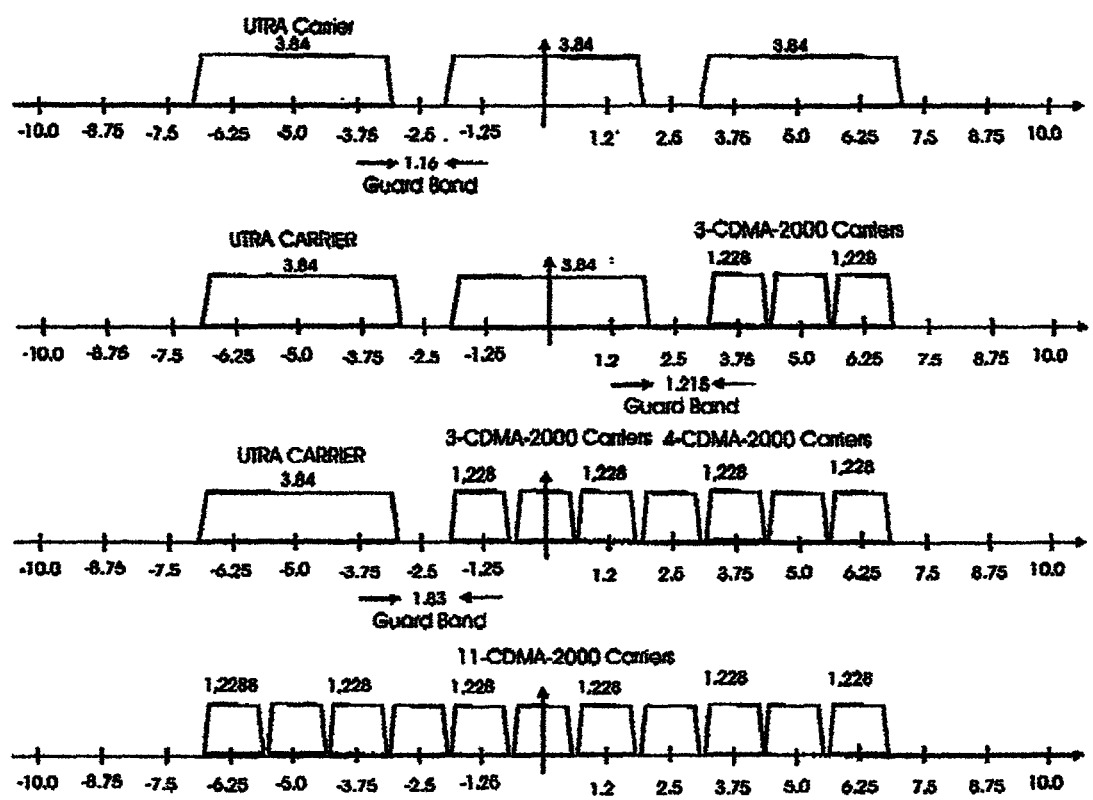
FIG. 1 depicts a Suite of Possible 3G Signal Spectra Formed by Various Combinations of UTRA bands and CDMA-2000 Bands.

When describing the processing technique presented herein we will use sample rates selected to satisfy the timing consideration. The sample rate indicated in FIG. 1 has been selected to demonstrate the high computational efficiency available for timing recovery from the process described herein.

The tasks and the associated modules that implement the functions in a traditional receiver are: (1) Spectral Translation, (2) Bandwidth Reduction, and (3) Output Sample Rate Selection. The Spectral Translation is performed by a complex heterodyne that translates the center of the desired spectral band to base-band. The complex heterodyne multiplies the input data sequence by samples of a cosine wave and a sine wave with frequency selected to match the center of the desired band. The Bandwidth Reduction is performed by a digital filter that processes the complex input data stream of the down-converted signal. The digital filter performs the required weighted sums to form the reduced bandwidth output data stream. The digital filter performs a low-pass filtering process that restricts the signal bandwidth to that of the translated band, and consequently rejects the remaining spectral components of the translated signal. The Output Sample Rate Selection is performed by a complex digital filter known as an interpolator that accept input data from the previously described low-pass filter at a fixed input rate that satisfies the Nyquist Criterion, and computes from these samples a set of output samples at an output rate different from the input rate and selected to satisfy some signal conditioning constraint in subsequent processing following this processing block.

SUMMARY OF THE INVENTION

The invention described here combines two or more of the processing tasks described above in a single filter, and further has the single filter perform the tasks for more than one center frequency signal. The filter structure is the well-known polyphase partition. In this structure a single filter is partitioned into M-parallel paths each representing a section of the prototype filter. The outputs of these paths are combined with fixed phase rotators to obtain separate time series from the multiple center frequency bands of interest. In this parallel path structure, different center frequencies only affect the set of scalar phase rotators associated with each path. Thus the combination of polyphase partition with their post filter phase rotators permits the single filter to operate at each of the filter bank center frequencies simultaneously.

Figure 3A:
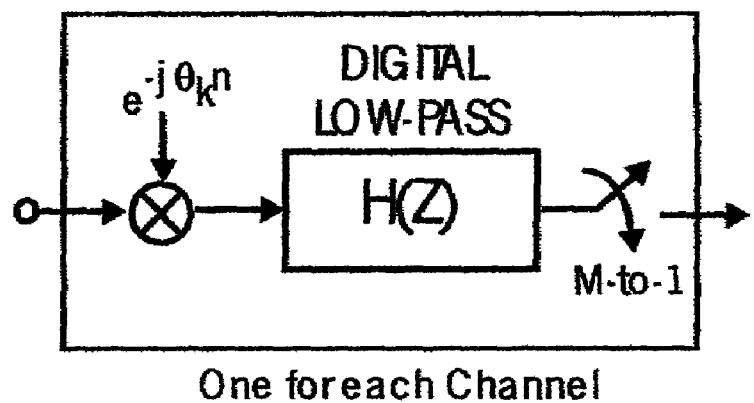
FIG. 3a depicts Traditional Order of Channel Selection and Processing.

FIG. 3 presents block diagrams of the sequence of transformations that preserve the desired signal-processing task while establishing the condition that enable a single polyphase partition of the filter to provide outputs signals, simultaneously, from different center frequencies. In the traditional receiver structure, shown in FIG. 3a, the complex heterodyne down converts or translates the spectrum of the input signal from its center frequency to the center frequency of the low-pass filter. Without loss of generality, we will assume the low pass filter is centered at DC or zero frequency.

Figure 3B:
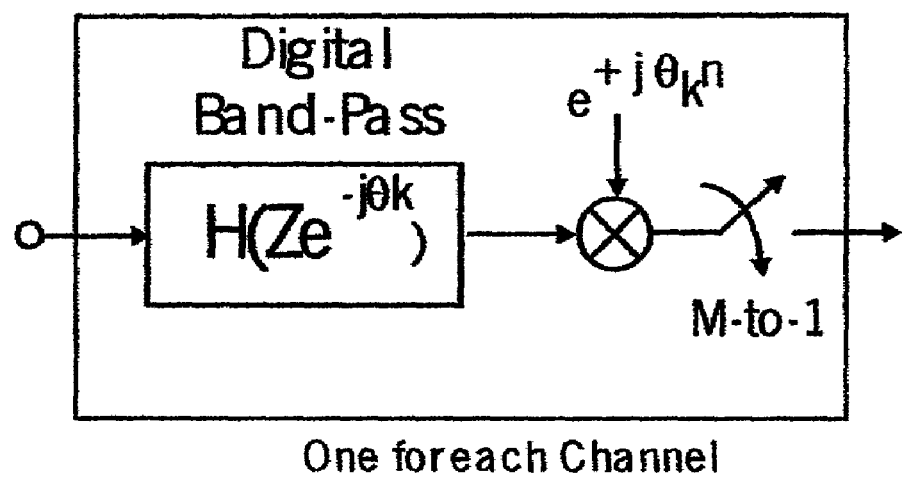
FIG. 3b depicts Reordered Channel Selection and Processing.

In an equivalent, but alternate structure, a complex band pass filter replaces the low pass filter. This filter has an impulse response formed as the product of the low pass impulse response h(n) and the up-converting complex heterodyne sequence exp(j 2 pi fc Ts n) of the same length. Here the heterodyne is applied to the filter to move its center frequency to the band center of the signal rather than the standard approach, which applies the heterodyne to the signal to move its band to the filter's spectral location. In this structure, the filtering occurs at the signal's center frequency, and the output of the filter is properly band limited but still resides at the carrier center frequency. If it is desired to translate the signal spectra to base band, this down conversion can be applied after the filter as shown in FIG. 3b.

Since the signal bandwidth has been reduced by the band limiting action of the digital filter, it is common to reduce the sample rate of the down converted and filtered time series. The heterodyne following the band pass filter can be moved to the low data rate side of the down sampler. Now only the samples delivered to the output of the down sampler are subjected to the heterodyne and the workload of the heterodyne is reduced by the same M-to-1 ratio of the input to output sampling rates. The down sampling operation is thus applied to the band-centered signal. Reducing the sample rate of the carrier centered signal results in an alias induced spectral translation of the center frequency from fc with angular rotation rate of 2 pi fc/fs per sample to an angular rotation rate of 2 pi M fc/fs modulo(2 pi). If the center frequency fc is any multiple of the output sample rate, say k fs/M, then the aliased rotation rate is 2 pi M (k fs/M)/fs modulo(2 pi) or k 2 pi modulo(2 pi) which is congruent to zero, which means the output rate of rotation is zero radians per sample. For the proper choice of center frequency relative to sample rate, the down sampled data samples represent a signal that has been aliased to DC. Selection of the sample rate to be an integer multiple of the signal center frequency is one of the suggested restrictions addressed earlier. The restriction is also applicable when the ratio of sample rate to center frequency is a rational ratio of small integers.

Figure 3C:
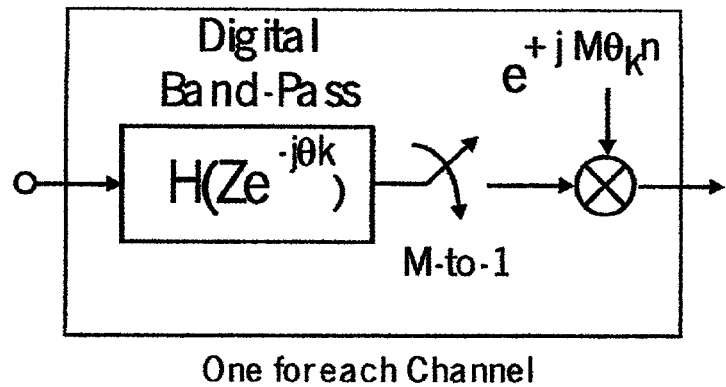
FIG. 3c depicts Reordering Re-Sampling and Down-Conversion.

Any multiple of the output sample rate will alias to DC or zero frequency. Similarly, any offset from a multiple of the output sample rate will alias to the same offset from DC or zero frequency. A heterodyne following the down sampling can then remove this residual offset. Thus the spectral translation from the channel center can be accomplished at the filter output prior to the down sampling or after the down sampling by a combination of aliasing and reduced data rate heterodyne. The sliding of the output heterodyne to the downside of the output resampler is shown in FIG. 3c. Applying the heterodyne after the down sampling as opposed to prior to the down sampling results in a reduction of computational workload for the heterodyne operation.

Figure 4:
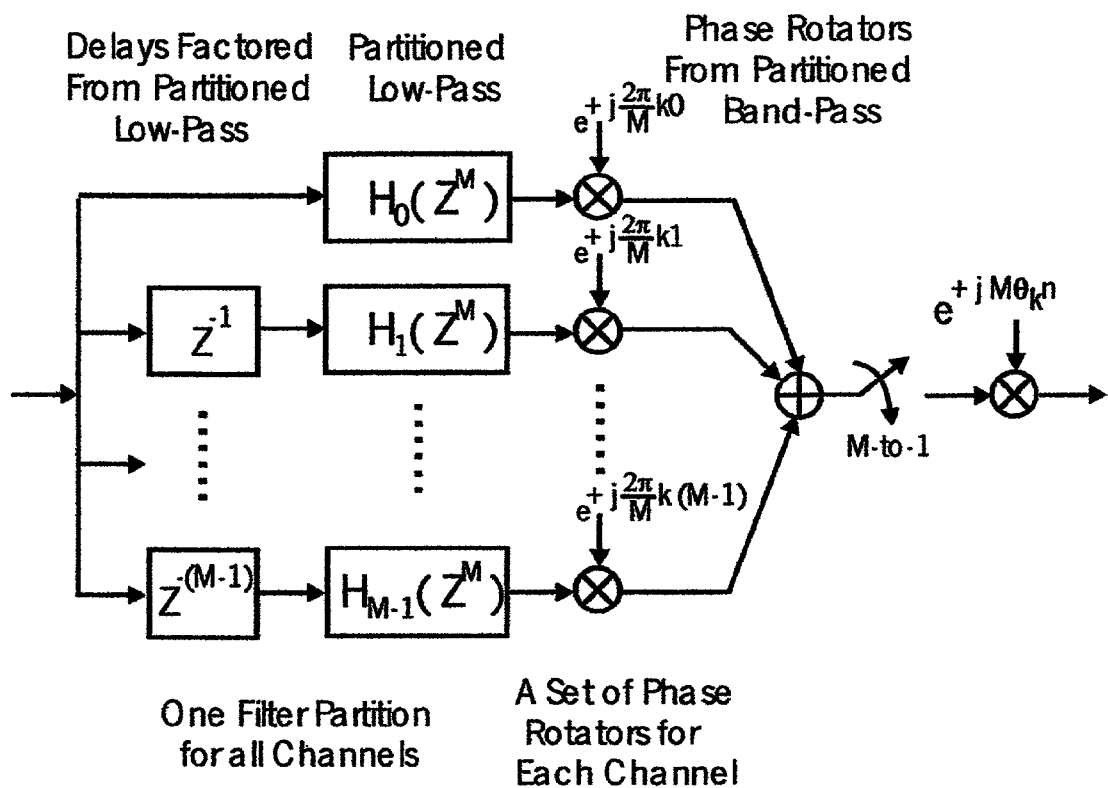
FIG. 4 shows A polyphase Partition of the Band Pass Filter Illustrating the Factoring to-the-Right of Phase Rotators from the Initial Up-Conversion Heterodyne of the Filter Weights.

FIG. 4 presents the polyphase partition of the band pass filter, with the filter operating at the input rate. In this M-fold partition the number of paths is defined by the number of center frequencies that alias to zero frequency when the output time series of the filter is down sampled from fs to fs/M. When the filtering operation includes the option to down sample prior to the filter we are permitted to change the input to output ratio by any rational ratio, 1/M representing only one of the options.

Figure 5:
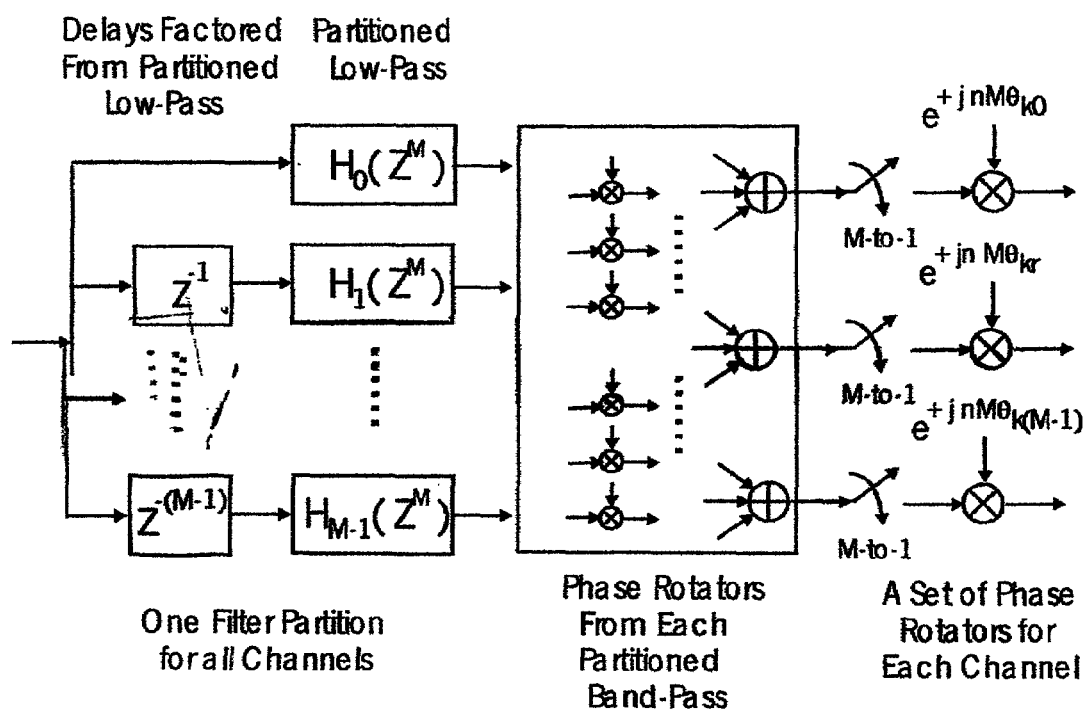
FIG. 5 shows Polyphase partition of a Single Prototype Low-pass Filter, With Post Filtering Phase Rotators Performing the Band Centering Complex Heterodyne for Each Desired Output Center Frequency.

FIG. 4 presents the partition of the prototype filter operating in the partitioned mode at the input rate with the output heterodyne applied after the down sampling operation. Here the scalars that contributed to the up-conversion heterodyne of the prototype low-pass filter have been factored forward and have been applied as scalar phase rotators after each sub filter. Different phase rotators with the same single filter partition are associated with different center frequencies, thus multiple center frequencies can be simultaneously accommodated with concurrent sets of phase rotators. Thus the partitioned filter can be considered a single-input, multiple output process with the separate outputs formed by phase-shifted sums of the sub filter outputs. This structure is shown in FIG. 5.

Figure 6:
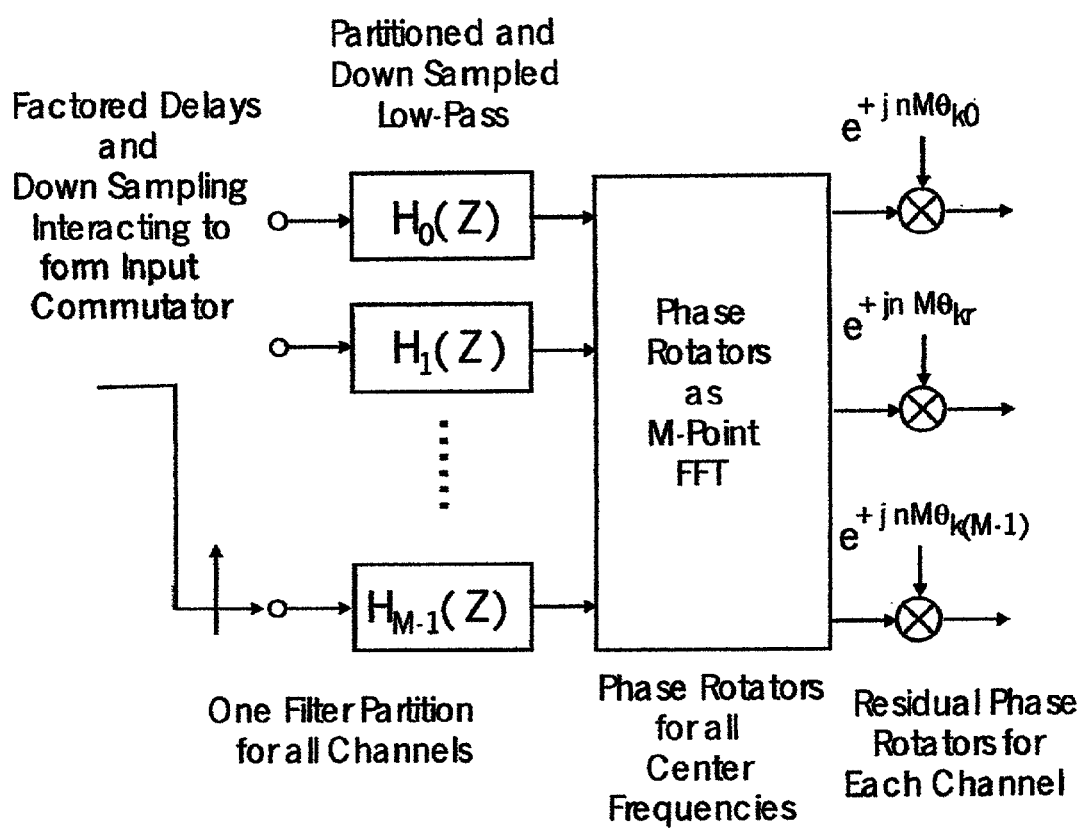
FIG. 6 shows Re-Sampled Polyphase Partition of the Band Pass Filter With Input Commutator, Down Sampled Stages, FFT Based Post Filter Phase Rotators For Channels Selection, and Residual Frequency Shift of Aliased Center Frequencies.

When a large number of phase rotators are required to service multiple channels, they are implemented as a fast Fourier transform (FFT). We still have the option to perform the output heterodyne prior to down sampling, or after, and we still have the option to perform the down sampling, with an input commutator, prior to the filter segments rather than after. System considerations related to the interpolation requirements following the filtering and down conversion influence where the down sampling operation is to be performed. Computational efficiency is increased as the down sampler is moved towards the input data stream. Moving the down sampler to the input of the process results in the structure shown in FIG. 6. The primary advantage of this structure is that all of the processing, the partitioned filter, the phase rotators, and the residual heterodyne are accomplished at the output rate with none of the processing proceeding at the input rate. This is the most efficient multi-channel partition process.

Figure 2:
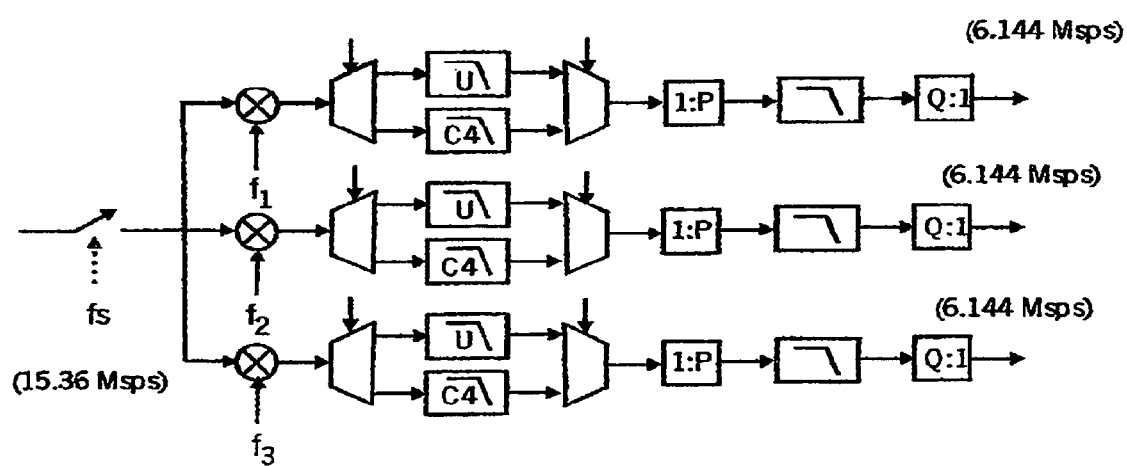
FIG. 2 shows Conventional Channelizer to Partition 3G Signal Set With Various Combinations of UTRA bands and CDMA-2000 Bands.

One final consideration in this class of polyphase filter partitions is that the down sampling that occurs via the input commutator can be modified to permit M-to-P sample rate change as opposed to the traditional M-to-1 change. This is accomplished by replacing the weight vector for each polyphase stage with a set of weight vectors that are cyclically accessed with period P while the stages are accessed with period M. This permits the sample rate change, normally allocated to a second interpolation filter, to also be imbedded in the polyphase filter. Thus the polyphase filter can, with proper attention to resampling, partitioning, and weight-set scheduling, accommodate the translation, filtering, and sample rate change of the entire filter bank process described in FIG. 2.

Returning to FIG. 1, we note that the signal spectra to be processed by the receiver can have various mixes of narrow band and wide band components. This mix extends from zero, one, two, or three wide band components with eleven, eight, three, and zero narrowband components respectively. At one end we have three wide band signals and at the other end we have eleven narrow band signals. The assets required for these two extremes are different and can be optimized individually for each signal set. The remaining two signal configurations are mixed and require assets for both low and high bandwidth processing.

Because of the two classes of signals to be processed, the polyphase filter structure can be implemented as a cascade of processing tasks in two modes. In the first mode, the filter is implemented as two independent parallel structures with one performing the processing required to implement or service the needs of all three wideband signals and one performing the processing required to implement or service the needs of the eleven narrowband signals. In the second mode, the filters operate in cascade with one filter partitioning the full input bandwidth into overlapping spectral bands matched to the spectral width of the three wideband components and one filter processing the reduced bandwidth signals obtained from the first filter to obtain, if required, additional bandwidth reduction matched to the narrowband signals. These configurations are shown in FIGS. 7 and 8. In both cases, processing assets not required to process the particular input signal configuration are disengaged and powered down. Following the philosophy that a filter should operate at the lowest possible sample rate consistent with its Nyquist rate, we will emphasize the second option composed of cascade processing tasks interspersed with appropriate resamplers between bandwidth reducing stages.

DESCRIPTION OF INVENTION

A set of digital filters composed of polyphase partitions of prototype low pass filters coupled with a process for performing sample rate changes within the filtering process is applied to the task of performing the simultaneous functions of channelizing, of filtering, and of resampling a frequency division multiplexed communication signal. In particular, the signal is a third generation (3G) signal suite composed of mixes of wideband UTRA (3.84 MHz) and narrowband (1.2244 MHz) spectral components with bandwidths and center frequencies shown in FIG. 1.

The collection of Multirate signal processing partitions and scheduling presented here take advantage of signal bandwidths and signal center frequency locations and separations to enable a single processing function to simultaneously perform bandwidth control, spectral translation, and resampling for separate channels with similar and related spectral characteristics. The process afford great reduction in processing load required to demodulate the multiple channels comprising the 3-G signal set.

The channelization system is first described at a high level by a collection of interconnected functional processing blocks assigned to perform specific processing tasks. The signal processing performed by a particular block may represent the entire processing required to extract a desired signal component from the composite signal, or it may represent one of a sequence of signal processing functions required to extract the desired signal. In general, the processing is performed in a hierarchal cascade of high level processing blocks. These blocks can be described by interconnections of lower level processing blocks that are common to many of the high level blocks. The filtering blocks are traditionally non-recursive because of the general ease with which the prototype low pass filter can be decomposed into polyphase segments. A particular class of recursive filters that permit the polyphase partition of its prototype low pass realization can also be used to form the processing blocks.

The recursive structures often exhibit spectral responses that occasionally require post processing spectral clean-up filters. These clean-up filters are unique to the recursive implementations, and represent additional processing blocks not present in the non-recursive implementation. The incentive to use a recursive implementation for the filtering blocks is the significant reduction in processing required for a given filtering task. The recursive polyphase filter can be implemented with structures that offer linear phase response, a property required to preserve signal fidelity. The recursive polyphase filter can also be implemented with non-uniform phase, with a marked reduction in processing workload. This option is viable when the receiver includes a channel equalizer that will attribute the filter phase distortion to the channel and correct it while inverting the channel response. The non-linear phase recursive polyphase structure offers additional flexibility in parameter selection for the cascade processing tasks. Implementations that mix and match from the three realization options can also offer design flexibility. This patent only describes the non-recursive implementation. Related and connected patents describe the recursive only, and the mixed non-recursive and recursive implementations.

First Processing Block

Figure 9:
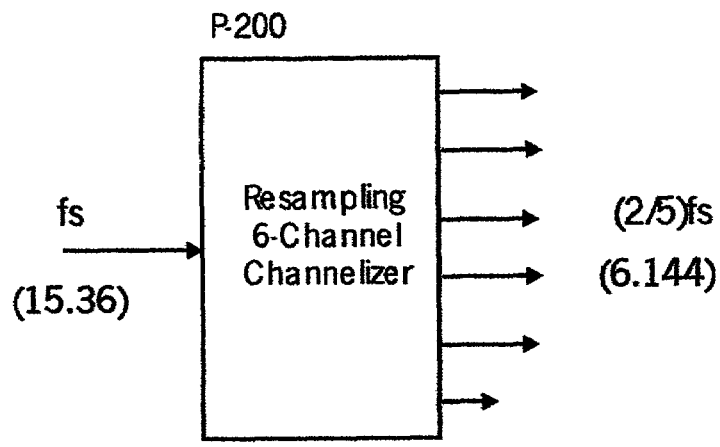
FIG. 9 shows Input-Output Signal Rates for Wideband Channelizer.
Figure 10:
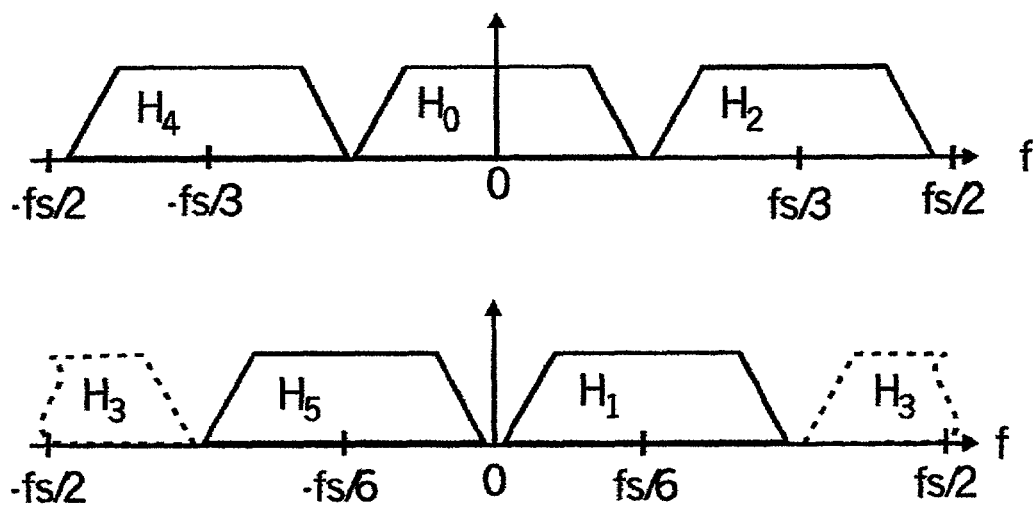
FIG. 10 shows Frequency Centers and Span for Six-Channel Channelizer.

The first processing block of this invention is shown in FIG. 9 This block processes the signal composed of three wideband components, each 3.84 MHz wide, and separated by 5-MHz spectral centers. This spectrum is the first one shown in FIG. 1. The input sample rate is 15.36 MHz, a frequency selected so that the desired output sample rate of 6.144 MHz is easily available by a sample rate change of 2-to-5 (up 2 and down 5). The Spectral responses of the six-channel channelizer are shown in FIG. 10. Three of the bands, centered at −fs/3, 0, and fs/3(−5.12 MHz, 0 MHz, and +5.12 MHz) are almost matched to the center frequency of the three-wideband UTRA carriers. The bandwidth spanned by the equivalent filters in the channelizer exceeds the UTRA bandwidth by a margin that allows for the offset of center frequencies. The remaining three bands overlap the first three and are centered at −fs/6, fs/2, and −fs/3 (−2.56 MHz, 7.68 MHz and −2.56 MHz). The band centered at the half sample rate is discarded so that five bands are extracted from the channelizer. The remaining pair of this second frequency set are reserved for sub-band partitioning of the CDMA-2000 carriers that are placed at ±2.56 MHz slots in two of the frequency assignment plans (see FIG. 1, third and fourth options).

Figure 11:
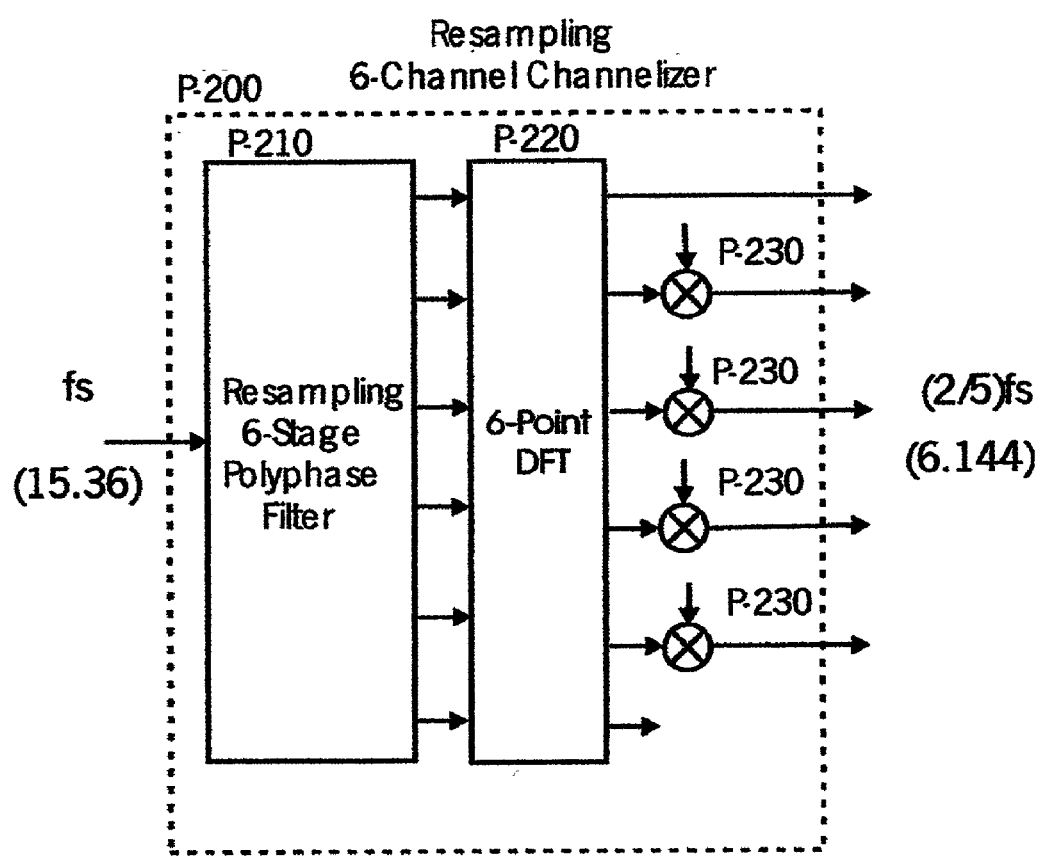
FIG. 11 shows Fundamental processing blocks of a resampling six-channel channelizer.

Three fundamental processing blocks shown in FIG. 11 forms the resampling six-channel Channelizer.

Figure 12:
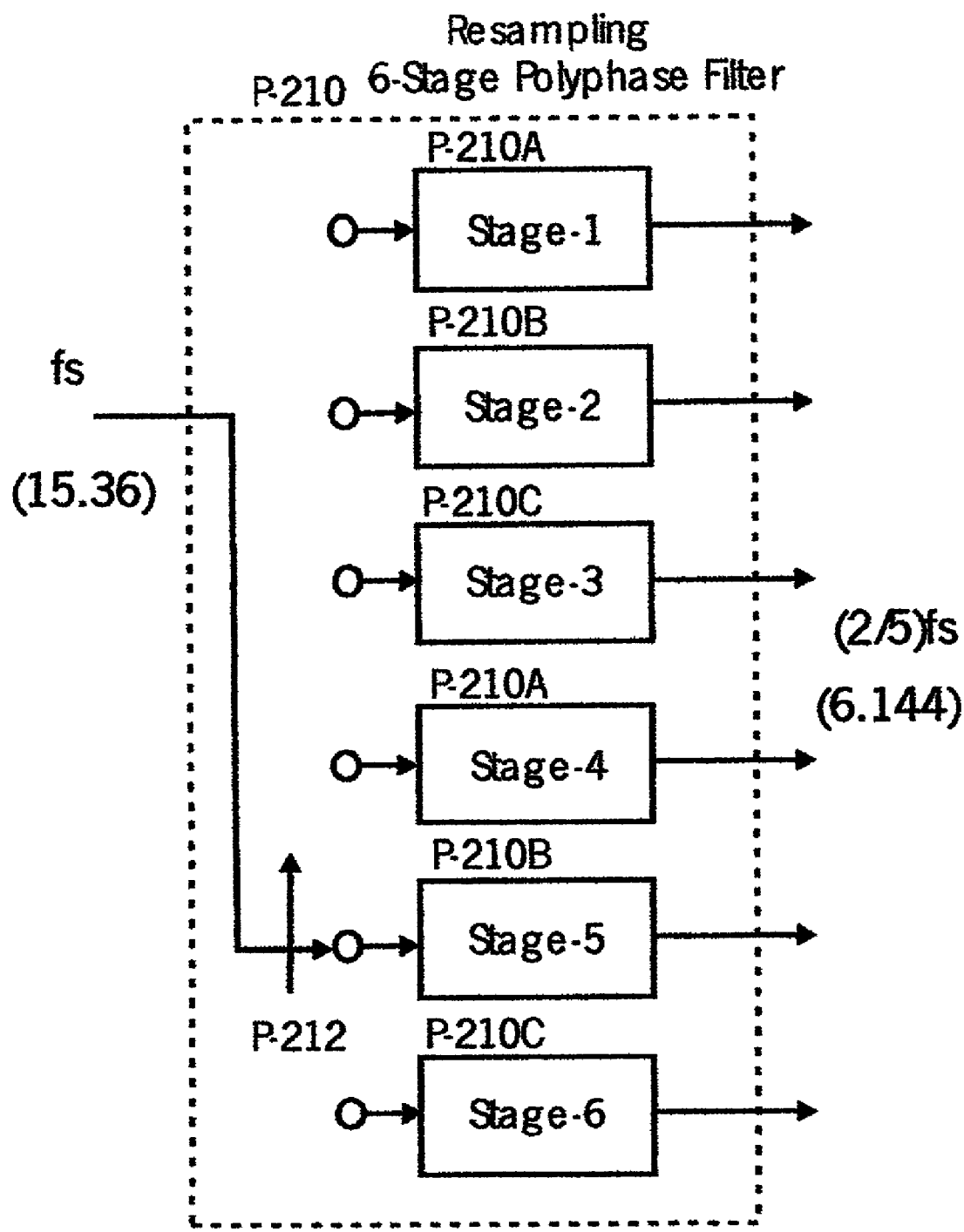
FIG. 12 shows Six stage resampling polyphase filter.

The initial processing block of the resampling 6-channel Channelizer is a resampling six-stage polyphase filter (P-210) that is shown in FIG. 12. The output of the polyphase filter is processed by a 6-point DFT (P-220) that may be implemented directly as a DFT or as a 6-point FFT. The 6-point DFT contains and applies the phase rotators to the output of the polyphase filter to perform a phase coherent extraction of the desired Nyquist zone from the aliased components now residing at zero frequency due to the down sampling operation. Heterodynes (P-230) are applied to four of the channelized time series to remove a residual frequency offset of the spectra aliased from the Nyquist zones centered at +5.12 MHz, 2.56 MHz, −2.56 MHz and −5.12 MHz. The residual offsets of 0.12 and of 0.06 MHz are the 0.12 MHz and 0.06 MHz offsets from the aliased center frequency relative to the channel center frequencies of ±5.00 MHz and ±2.56 MHz respectively.

Figure 13:
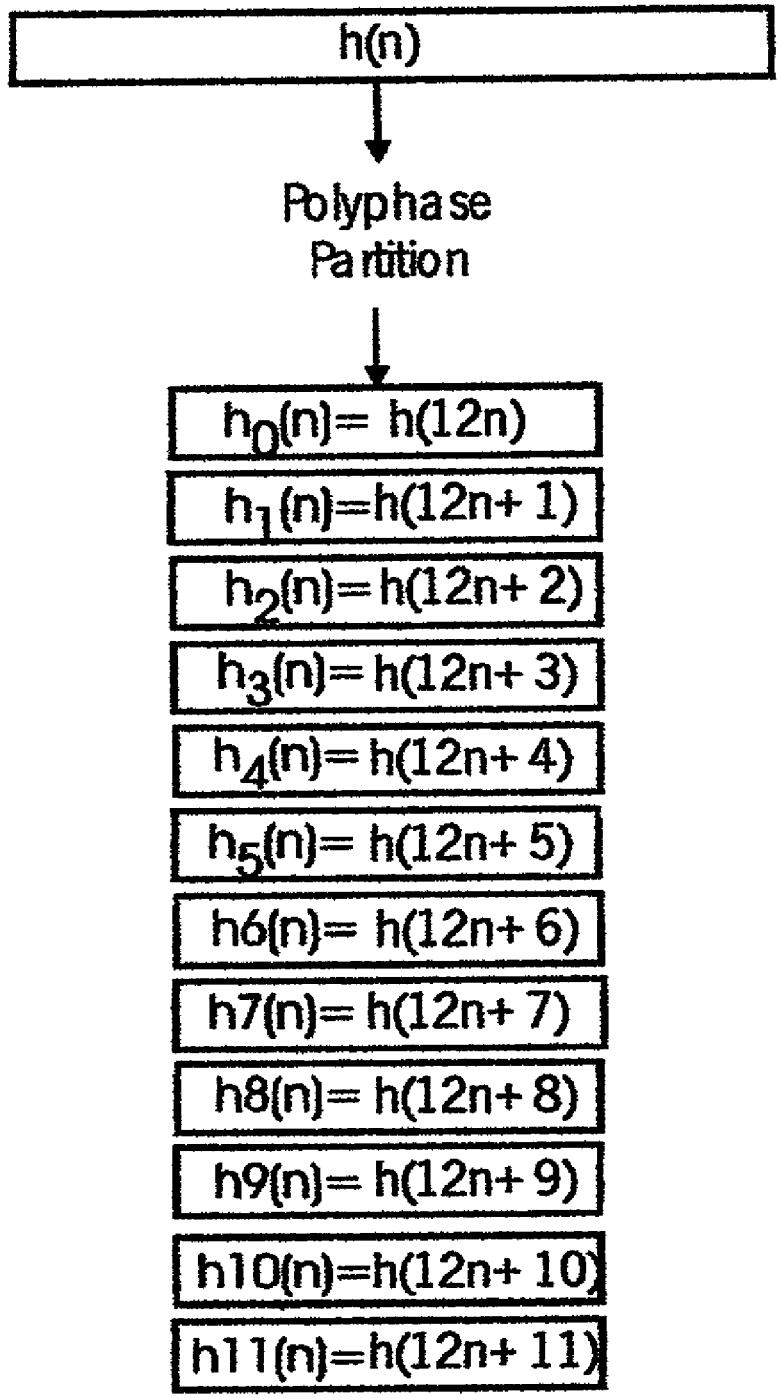
FIG. 13 shows Partition of Prototype Low Pass Weight Set for Use in an Embedded 1-to-2 Down Sampling, Six Stage Polyphase Filter.

The resampling six-stage polyphase filter (P-210) shown in FIG. 12, is formed as a multi-path filter containing six stages (P-210A, P-210B, P-210C, P-10D, P-210E, and P-210F) and commutator (P-212) as a means for delivering successive samples of the input data stream to appropriates stages of the polyphase filter. A control mechanism, not shown, schedules input samples to successive stages while simultaneously scheduling weight sets to those stages. The interaction of the two scheduling routines accommodates a simultaneous 1-to-2 up sampling of the input data stream and a 5-to-1 down sampling of each output stream. The polyphase partition of a prototype low pass filter with design bandwidth matched to signal bandwidth (3.84 MHz+0.24 MHz), but designed with double sample rate (30.72 MHz) to accommodate the embedded 1-to-2 up sampling is shown in FIG. 13. As indicated, the partition for the r-th stage is $h_r(n)=h(r+6n)$.

Figure 14:
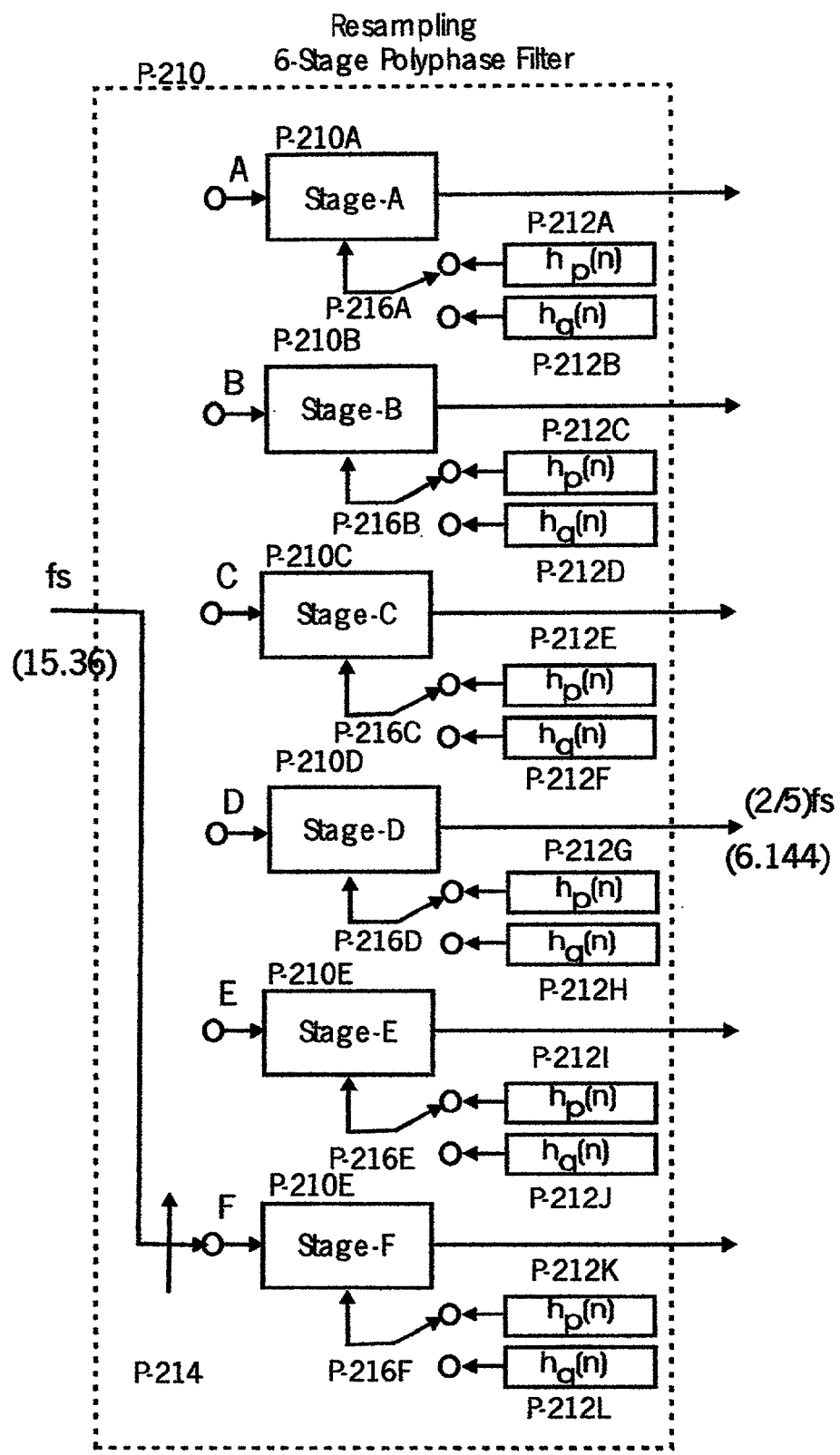
FIG. 14 shows Scheduling of Input data Commutator and Internal Weight Set Commutator.

The scheduling of the input commutator and of the weights of this polyphase partition is shown in FIG. 14. Here the six registers storing the input samples are labeled from top to bottom Reg_A, Reg_B, Reg_C, Reg_D. Reg_E, and Reg_F respectively. A state machine that cycles through twelve consecutive state conditions for FIG. 14 controls the commutator scheduling. This schedule is shown in table 1. The way the table is to read is as follows. In state 1. Three inputs are delivered in order to upper-case registers C, B, and A. In this state, lower-case registers f, e, and d receive no inputs. Filter weights 5, 3, 11, 9, and 7 are applied to the data in the registers which have the same ordering as the registers. That is, in this state, Register C receives input sample d(n) and applies Weight Set 5, Register B receives input sample d(n+1) and applies Weight Set 3, Register A receives input sample d(n+2) and applies Weight Set 1. No additional inputs are received in this state. The remaining registers apply the indicated Weights Sets to their contents without having received new input samples as indicated: Register f applies Weight Set 11, Register e applies Weight Set 9, and register d applies Weight Set 7. Note that in successive states, the input port distributes either 3 or 2 samples to the appropriate registers, and that the weight sets alternate between the even indexed and the odd indexed assignments.

state #1 3-inputs C,B,A,f,e,d filters 5,3, 1,11,9,7
state #2 2-inputs F,E,d,c,b,a filters 4,2,12,10,8,6
state #3 3-inputs D,C,B,a,f,e filters 5,3, 1,11,9,7
state #4 2-inputs A,F,e,d,c,b filters 4,2,12,10,8,6
state #5 3-inputs E,D,C,b,a,f filters 5,3, 1,11,9,7
state #6 2-inputs B,A,f,e,d,c filters 4,2,12,10,8,6
state #7 3-inputs F,E,D,c,b,a filters 5,3, 1,11,9,7
state #8 2-inputs C,B,a,f,e,d filters 4,2,12,10,8,6
state #9 3-inputs A,F,E,d,c,b filters 5,3, 1,11,9,7
state #10 2-inputs D,C,b,a,f,e filters 4,2,12,10,8,6
state #11 3-inputs B,A,F,e,d,c filters 5,3, 1,11,9,7
state #12 2-inputs E,D,c,b,a,f filters 4,2,12,10,8,6

Table 1. State Related to Input Port Commutator and Internal Weight Vector Commutators The schedule of FIG. 14 allows for alternate processing of three input samples and then two input samples so that for every five inputs we extract two outputs from each polyphase output port. The interaction of the input commutator (P-214) and the weight commutators (P_216) reflects the book keeping involved in tracking the non zero samples of an equivalent 1-to-2 zero-packing for the 1-to-2 up sampling at the filter input.

The six output samples from the output ports of the resampling 6-stage polyphase filter are presented to a six-point DFT (P-220). This is a standard numerical algorithm that can be implemented directly as a pruned collection of Inner-products, as a factored FFT, or as a reduced multiplication Winograd Transform.

The five retained output samples from the 6-point DFT are time samples representing translated, filtered, and re-sampled signals from each of the center frequency bands described earlier. These include the three-wideband signals comprising the 3-G signal set as well as the overlapped bands centered at ±2.5 MHz that are only used in the last two frequency assignments shown in FIG. 1.

Note that a single stage prototype filter has been used to filter, translate, and resample all three wideband channels. As well as prepare the overlapped bands for further processing. The filter length selected to demonstrate and verify concepts was of length 200, which when distributed over the 12 polyphase stages mapped into 21 coefficients per stage. Let us compare the savings attributable to the polyphase filter partition. In the direct implementation, a 90-tap prototype low pass FIR filter will meet the transition bandwidth and out-of-band attenuation requirements for the broadband channel decomposition. Similarly, a 10-tap prototype low pass FIR filter will meet the transition bandwidth and out-of-band attenuation requirements of the up-2, down-5 interpolator. Using these lengths as a benchmark, we can compare the relative workloads, in equivalent complex operations, of the two options, direct processing and the technique described here. A complex operation (comp-op) is considered to be a complex scalar multiply and add, requiring two real multiplies and adds. In the direct implementation, the workload to process 5 input samples is 20 comp-ops for the input heterodynes, 1350 comp-ops for the three filters, and 60 comp-ops for the interpolators. The workload for all three channels is 1430 comp-ops per 5-inputs or equivalently 1430 comp-ops per 2-outputs. Normalizing by the number of channels and number of data points we obtain a workload of approximately 95 comp-ops per input data point per channel or 238 comp-ops per output data point per channel. In the polyphase resampling implementation the workload to process 5 input samples is 200 comp-ops for the filter, 16 comp-ops for the DFT, and 40 comp-ops for the output heterodynes for a total of 256 comp-ops per 5-inputs or 256 comp-ops per 2-outputs. Normalizing by number of channels and number of data points we obtain a workload of approximately 17 comp-ops per input data point per channel or 44 comp-ops per output data point per channel. The relative workload for the direct versus the polyphase resampler is approximately 5-to-1. In this comparison, we included the complex heterodynes and DFT processing required for the two overlapped channels an unnecessary processing burden for the three wide-band channels.

Second Processing Block

Figure 15:
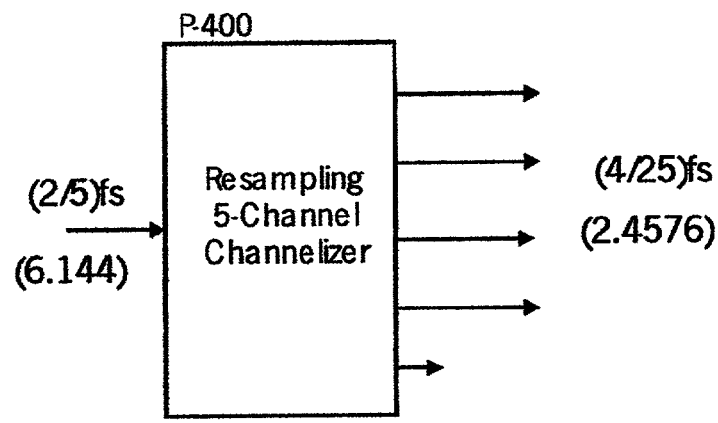
FIG. 15 shows Input-Output Sample Rates of Narrow Band Channelizer.

We now consider the second processing block of this invention, the resampling 5-channel channelizer that is shown in FIG. 15. This processing block performs the second level partition of the wideband bandwidth into three narrowband bands occupying the same nominal bandwidth of the single broadband channel. This process also extracts the narrowband signal from the two overlapped bands when required. This set of signals is composed of three or four CDMA-2000 channels separated by 1.25 MHz offsets and centered at +5.0 MHz as shown in the mixed signal set presented in the second option in FIG. 1.

Figure 16:
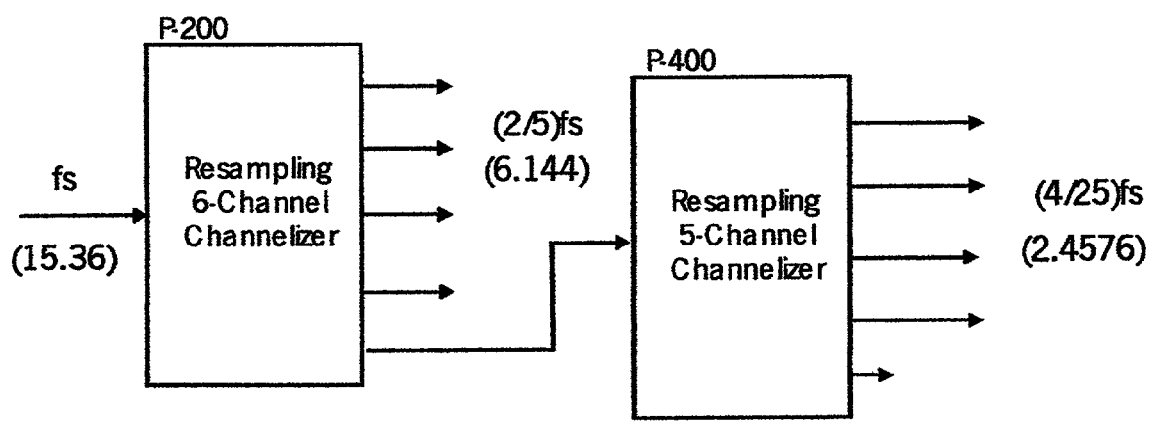
FIG. 16 shows Cascade of Resampling 6-Channel and Resampling 5-Channel Channelizers.

The 5-channel resampling channelizer uses the 6-channel resampling channelizer as a preprocessor and initial bandwidth and sample rate reducer. This arrangement is shown in FIG. 16.

Figure 17:
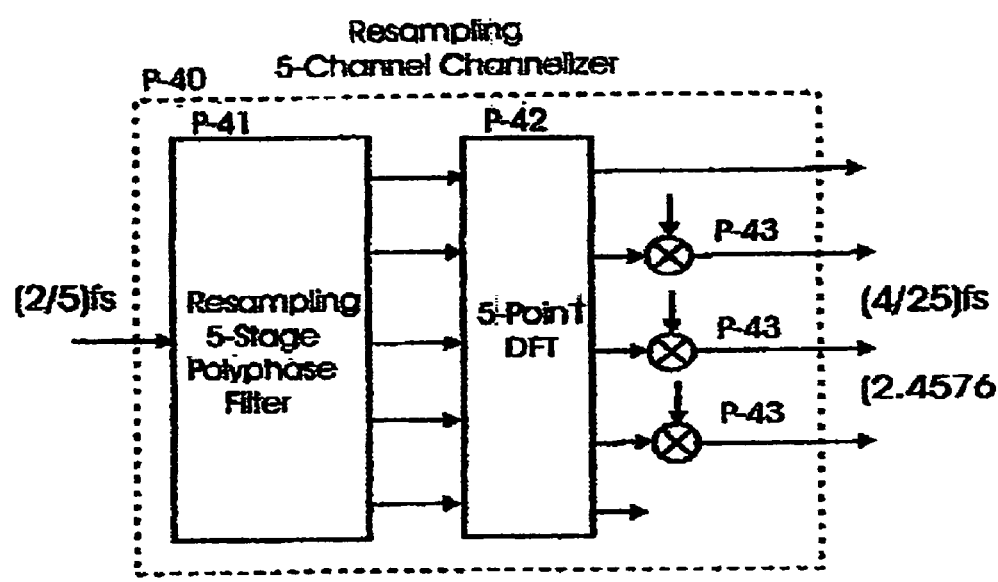
FIG. 17 shows Fundamental Processing Blocks of Narrowband Five-Channel Chanelizer.

Three fundamental processing blocks of the resampling 5-channel channelizer are shown in FIG. 17.

Figure 18:
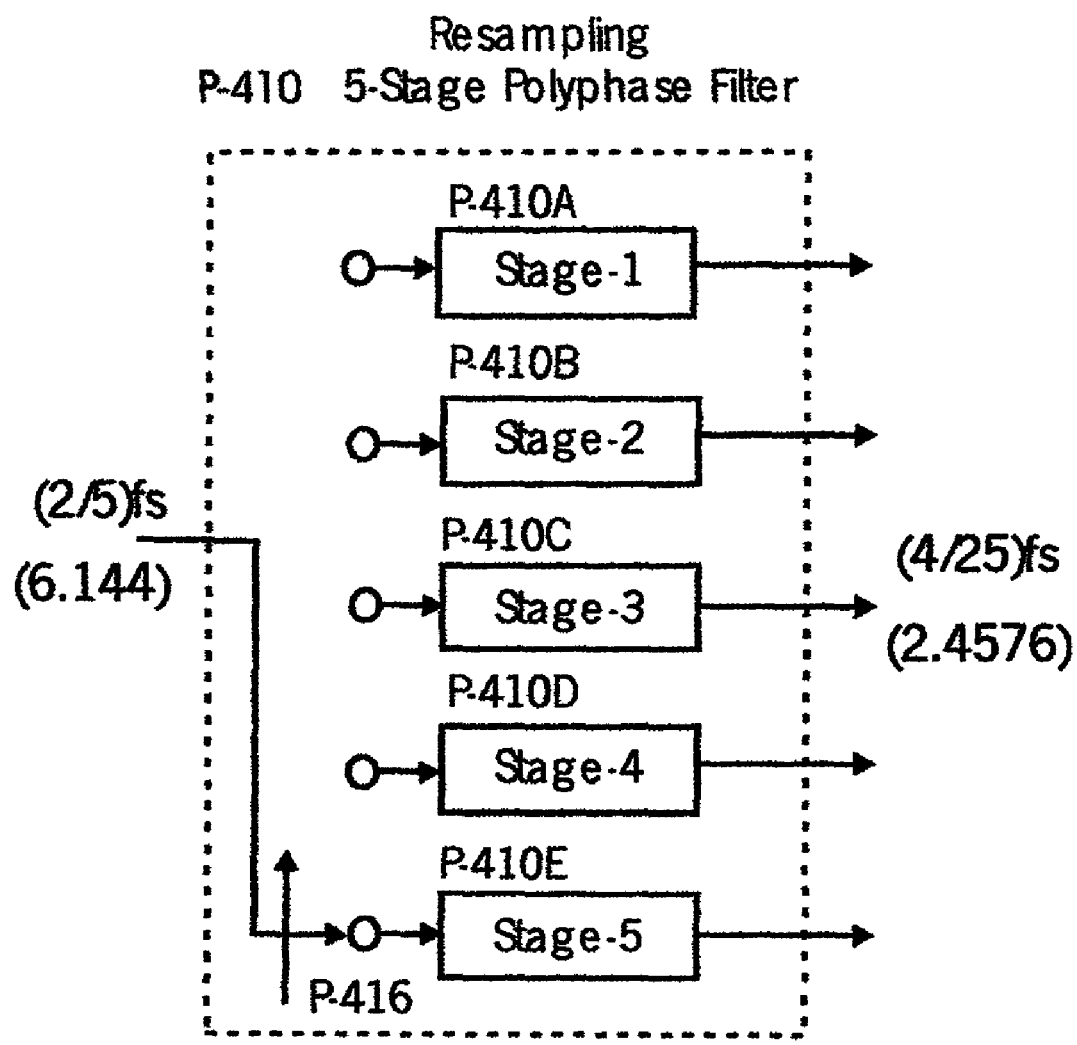
FIG. 18 shows Resampling up-2, down 5, 5 Stage Polyphase Filter.

The initial processing block of the narrowband 3-channel Channelizer is a resampling five-stage polyphase fiter (P-410) that is shown in FIG. 18. The output of the polyphase filter is processed by a 5-point DFT (P-420) that may be implemented directly as a pruned DFT or as a 5-point Winograd FFT. The 5-point DFT contains and applies the phase rotators to the output of the polyphase filter to perform a phase coherent extraction of the desired Nyquist zones from the aliased components now residing at zero frequency due to the down sampling operation. Heterodynes (P-430) are applied to three of the channelized time series to remove a residual frequency offset of the spectra aliased from the two Nyquist zones centered at +1.2288 MHz and −1.2288 MHz and the Nyquist zone at 2.4576 MHz. The residual 0.0212 MHz and 0.0424 MHz offsets are the 0.0212 MHz offset and 0.0424 MHz offset from the aliased center frequency of the channel center frequencies of +1.250 MHz and 2.500 MHz.

The resampling five-stage polyphase filter (P-410) shown in FIG. 18, is formed as a multi-path filter containing five stages (P-410A, P-410B, P-410, P-410D, and P-410E) and commutator (P-416) as a means for delivering successive samples of the input data stream to appropriate stages of the polyphase filter. A control mechanism, not shown, schedules input samples to successive stages while simultaneously scheduling weight sets to those stages. The interaction of the two scheduling routines accommodates a simultaneous 1-to-2 up sampling of the input data stream and a 5-to-1 down sampling of each output stream.

Figure 19:
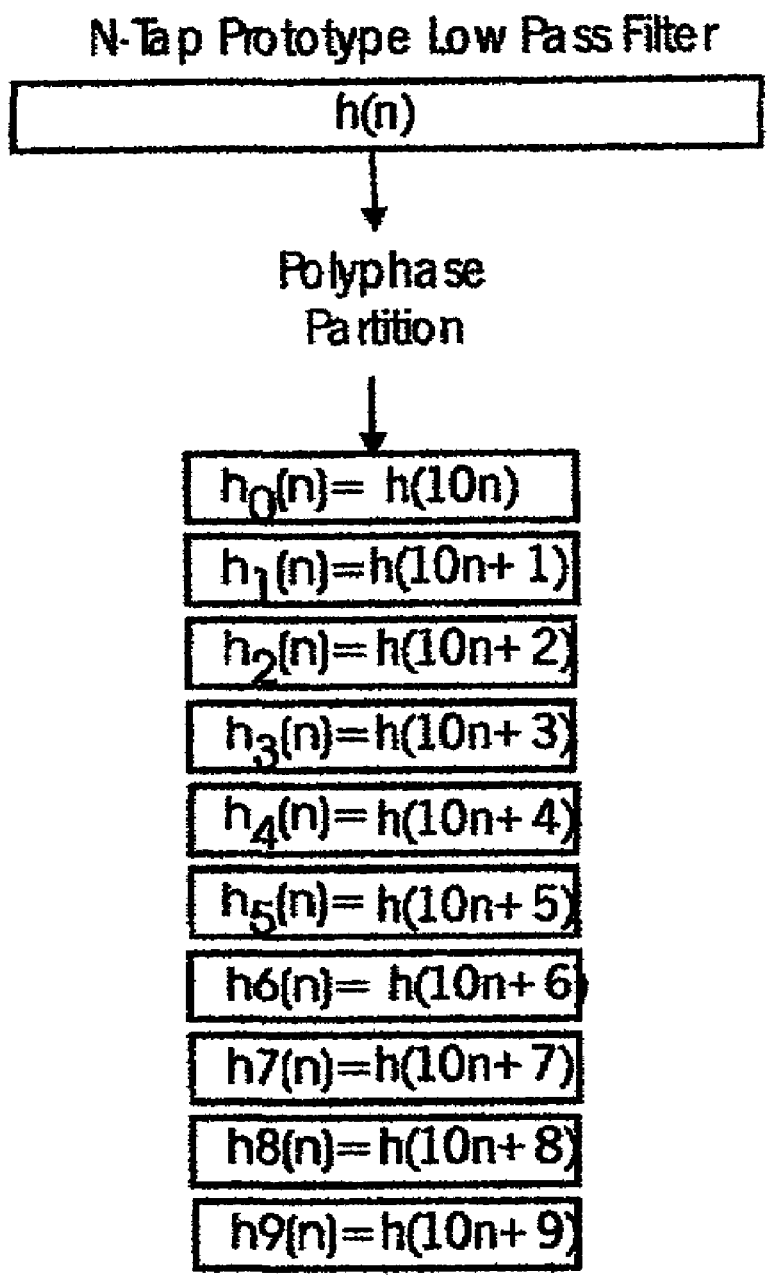
FIG. 19 shows Partition of Prototype Low Pass Weight Set for Use in an Embedded 1-to-2 Down Sampling, Five Stage Polyphase Filter.

Here the polyphase filter is applied to the signal to affect the spectral aliasing and apply a course bandwidth reduction to permit a sample rate reduction to 2-samples per symbol. The polyphase partition of a prototype low pass filter with design bandwidth matched to signal bandwidth (1.2288 MHz) but with large transition band (1.2288 MHZ) and designed with double sample rate (12.288 MHz) to accommodate the embedded 1-to-2 up sampling is shown in FIG. 19. As can be seen, the partition for the r-th stage is hr(n)=h(r+10n).

Figure 20:
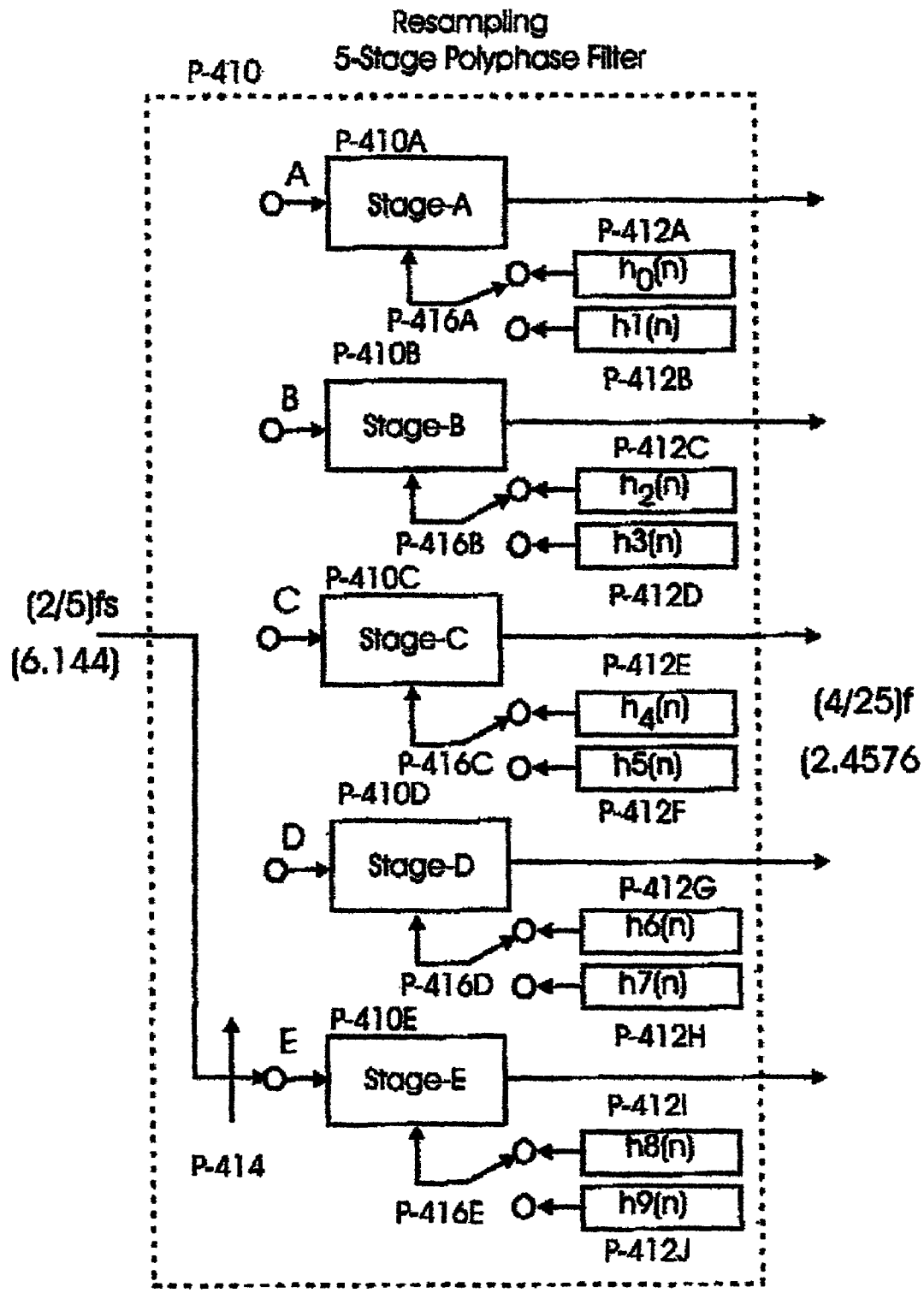
FIG. 20 shows Scheduling of Input data Commutator and Internal Weight Set Commutator.

The scheduling of the input commutator and of the weights of this polyphase partition is shown in FIG. 20. Here the five registers storing the input samples are labeled from top to bottom Reg_A, Reg_B, Reg_C, Reg_D, and Reg_E respectively. The input data samples are introduced to successive input ports as the commutator moves cyclically up port addresses. A state machine that cycles through two consecutive state conditions listed in FIG. 20 controls the commutator scheduling. The schedule allows for alternate scheduling of three input sample and then two input samples so that for every five inputs we extract two outputs from each polyphase output port. The interaction of the input commutator (P-414) and the weight commutators (P_416) reflects the book keeping involved in tracking the non zero samples of an equivalent 1-to-2 zero-packing for the 1-to-2 up sampling at the filter input.

The scheduling process coupling the input commutator and the internal weight commutatotrs is shown in table 2.
State #1 3-inputs: C,B,A,f,e Filters: 3,2,1,5,4
State #2 2-inputs: F,E,c,b,a Filters: 2,1,5,4,3

Table 2: State Schedule for Commutating Input Samples to Internal Registers and for mmutating Filter Weight Sets to Internal Registers The five output samples from the output ports of the resampling 5-stage polyphase filter are presented to a five-point DFT (P-420) from which we extract three or four of the five outputs. This is a standard numerical algorithm that can compute the 4 or 5 desired output points as a pruned collection of inner products, or as a Winograd Transform requiring fewer products. The three or four output samples from the 5-point DFT are time samples representing translated, filtered, and re-sampled signals from each of the narrowband signals comprising the CDMA-2000 signal set. As described earlier, the aliased signals from the ±1.250 MHz and 2.50 MHz centers are further heterodyned by the pair of complex heterodynes (P-430) to finish the translation process.

Note that a single stage prototype filter has been used to filter, translate, and resample all three or four narrowband channels from an initial input rate of 5 samples per symbol down to a lower sample rate of 2 samples per symbol. A 108-tap prototype low pass FIR filter will meet the transition bandwidth and out-of-band attenuation requirements. Using this length as a benchmark, we can compare the relative workloads, in equivalent complex operations, of the two options, direct processing and the technique described here. In the direct implementation, the workload to process each input sample is 2 comp-ops for the input heterodyne and 40 comp-ops for the filter for a total of 104 comp-ops per input per channel. In the polyphase resampling implementation using the same filter, the workload to process 5 input samples is 80 comp-ops for the filter, 16 comp-ops for the DFT, and 12 comp-ops for the output heterodynes This is a total of 108 comp-ops per 5-inputs. Normalizing by the number of channels and number of input data points we obtain a workload of approximately 5 comp-ops per input data point per channel. The workload ratio for direct versus the down sampling technique is approximately 21-to-1. The embodiment of the invention currently preferred by the inventor has been described, but one skilled in the art of digital signal processing and digital receiver design will be enabled by acquaintance with the foregoing disclosure to design a number of alternative embodiments of this invention, and this should be borne in mind when construing the scope of the claims which follows this specification.

I claim:

1. A receiver for receiving and efficiently separating a composite 3-G wireless communications signal into constituent baseband components, wherein said receiver combines multiple processing tasks of a 3-G receiver into a single device, said device performs the processing required for multiple channels, the single device comprising, a resampling polyphase filter for performing tasks of simultaneous spectral translation of multiple contiguous spectral regions to baseband, the tasks including:

a.) separating the signals residing in the multiple contiguous spectral regions for bandwidth reduction of each of a varied bandwidth signal component, b.) performing interpolation to change sample rates of each of a multiple output series by a rational ratio matched to the bandwidth of each signal component, and a single polyphase filter coupled to operate in a resampling mode such that sample rate inputs and sample rate outputs are different.

2. A receiver for receiving and efficiently separating a composite 3-G wireless communications signal into constituent baseband components, wherein said receiver combines multiple processing tasks of a 3-G receiver into a single device, said device performs the processing required for multiple channels, the single device comprising, a filter for;
 a.) changing a sample rate to induce spectral aliasing of multiple spectral regions, and
 b.) operating in a resampling mode for intentional aliasing of each of several spectral regions and outputting simultaneous separate data streams from varied bandwith spectral regions at varied output sample rates.

* * * * *